May 3, 1960  J. J. FELTS  2,935,334
MOTOR VEHICLE WHEEL SUSPENSION
Filed March 8, 1957  2 Sheets-Sheet 1
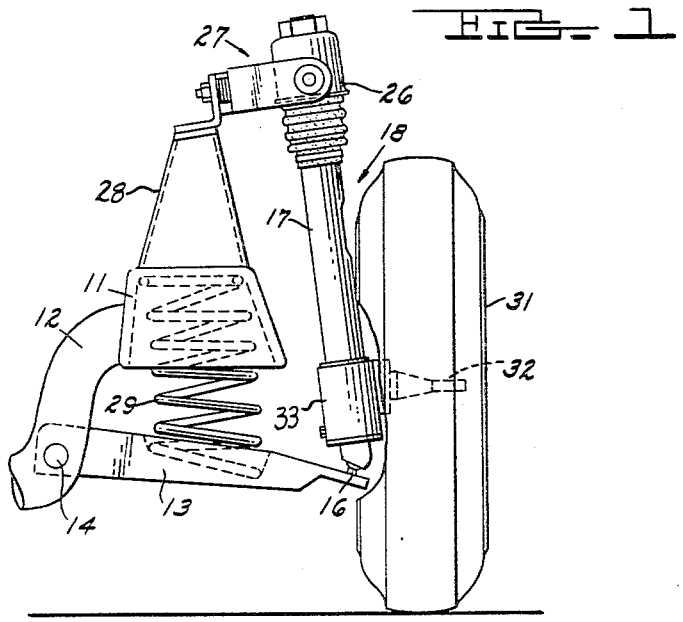
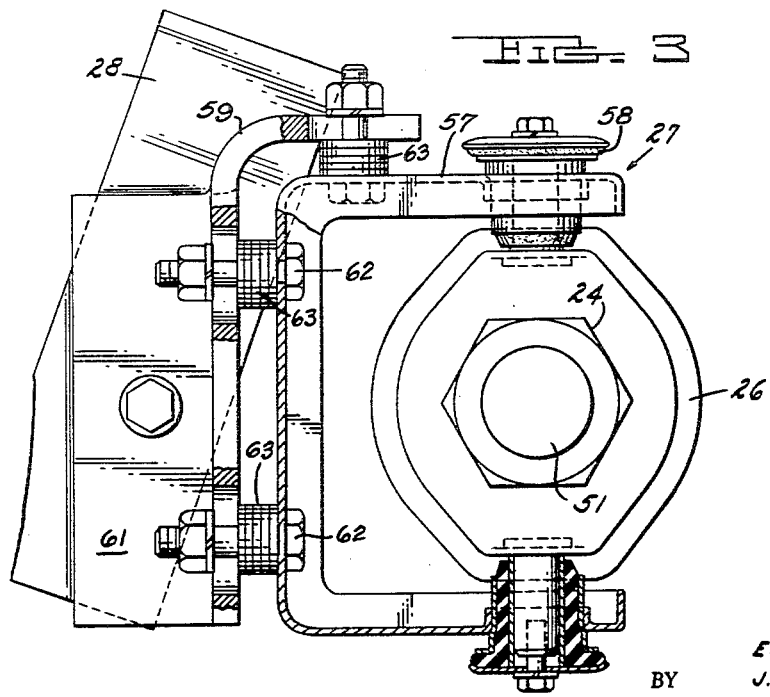
J. J. FELTS
E. C. McRAE
J. R. FAULKNER
T. H. OSTER
INVENTOR.
BY
ATTORNEYS

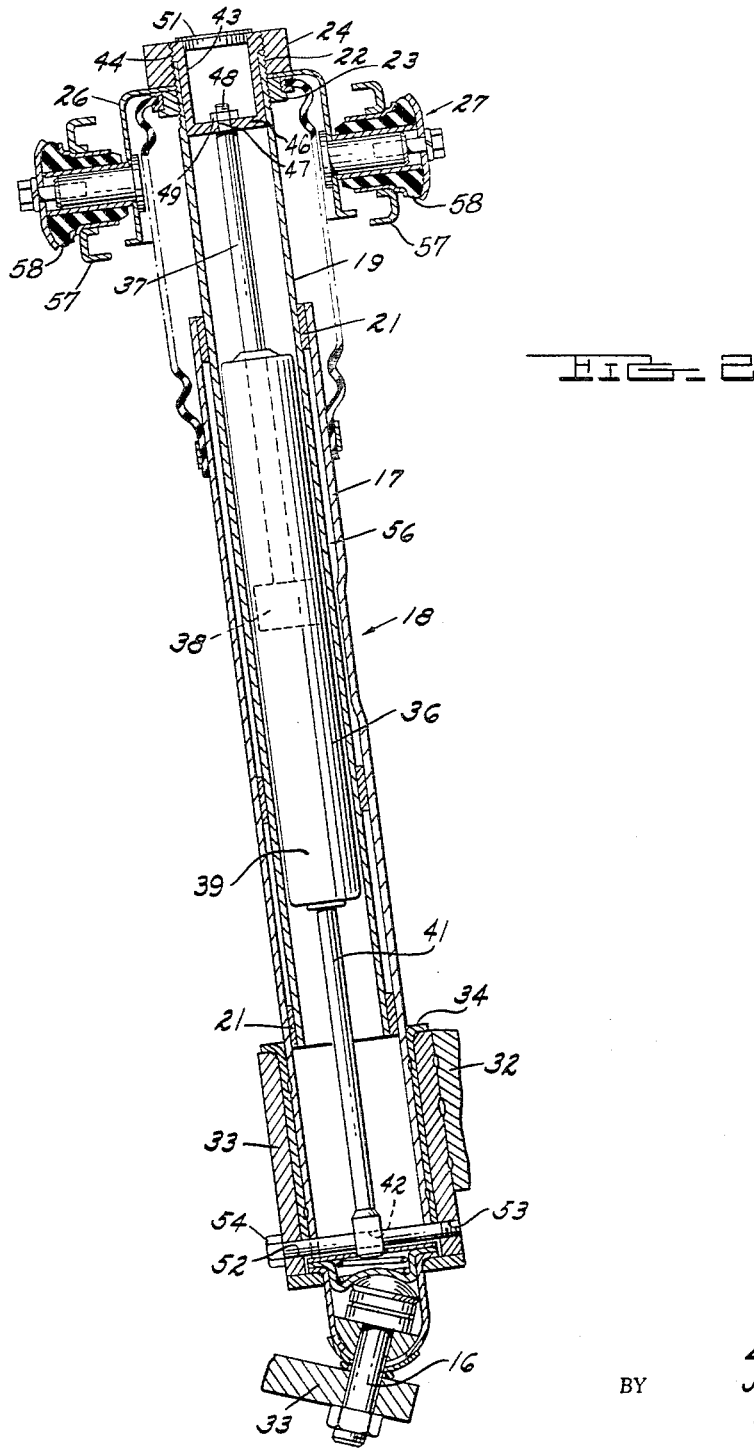

United States Patent Office 2,935,334
Patented May 3, 1960

2,935,334

MOTOR VEHICLE WHEEL SUSPENSION

Jerome J. Felts, Detroit, Mich., assignor to Ford Motor Company, Dearborn, Mich., a corporation of Delaware Application March 8, 1957, Serial No. 644,938

6 Claims. (Cl. 280—96.2)

This invention relates generally to motor vehicles and, particularly, to a novel arrangement of the shock absorber and supporting telescopic member.

The present invention is directed to a motor vehicle wheel suspension of a pillar-type incorporating a shock absorber in an expansible telescopic assembly in which the cooperating telescopic strut members provide guiding means for the road wheel of the vehicle during its rising and falling movements relative to the sprung structure of the vehicle.

In the illustrated embodiment of the invention, the shock absorber unit is housed within and free from contact with strut side walls. Stresses caused by wheel side loading conditions and/or jounce or rebound movements of the wheel tend to deflect or bend the strut members. This deflection or bend does not interfere with the shock absorber as there is no impinging or contact between the strut wall and the shock absorber.

A further advantage is shown in the simple mounting of the shock absorber to the outer ends of the inner and outer struts. Because the shock absorber is a completely separate and distinct unit from the supporting struts, replacement of the shock absorber is both easy and economical and results in considerable savings in service time.

Other objects and advantages of this invention will be made more apparent as this description proceeds, particularly when considered in connection with the accompanying drawings wherein:

Figure 1 is a fragmentary front elevational view of a portion of a motor vehicle chassis incorporating the suspension system of the present invention;

Figure 2 is an enlarged vertical cross-sectional view taken of the structure shown in Figure 1; and, Figure 3 is an enlarged plan view partly in section of the structure shown in Figure 2.

Referring now to the drawings, the reference character 11 indicates generally the longitudinally extending frame member of a motor vehicle to which is weldably secured tubular transverse frame member 12. A lower wishbone 13 is pivotally connected to the transverse cross frame member 12 as at 14 and at its outer end is connected by means of a ball joint 16 to the wheel spindle hub portion 33 which in turn is secured to an intermediate sleeve 34 which is weldably secured to the outer strut 17 of a shock absorber and telescopic control unit 18. Telescopically received within the outer tube 17 is an inner struct 19. Bearings 21 are provided between said inner and outer struts 19 and 17 at their upper and lower ends.

The upper end 22 of the tube 19 is externally threaded and is secured by supporting nut 23 and securing nut 24 to an elliptical shaped inverted cup 26 which is part of the flexible support indicated generally at 27. Support 27 is comprised of a U shaped member 57 which is supported on a pair of resilient pivot bushing assemblies 58 which are secured to the sides of the inverted cup 26. U shaped member 57 is rigidly connected to upstanding arm 59 of L shaped bracket 61 by bolts 62. The proper castor and camber adjustment of the road wheel is obtained by placing the proper number of shims 63 between the arm 59 and the member 57 on the bolts 62. As can be seen in Figures 1 and 3, bracket 61 is secured to a generally truncated cone member 28 which in turn is secured to the frame rail 11. A coil spring 29 is positioned between the wishbone 13 and the rail 11.

The vehicle front road wheel 31 is conventionally rotatably mounted upon a wheel spindle 32. The wheel spindle 32 is formed with a cylindrical hub portion 33. An intermediate sleeve 34 is positioned between the hub 33 and the outer tube 17 and is weldably secured to the outer tube 17 at spaced apart points.

Referring now to Figure 2 in particular, an integral shock absorber unit is indicated at 36 provided with a plunger rod 37 with a piston portion 38 at its lower end. The piston portion 38 is, of course, confined within the cylindrical body 39 of the shock absorber 36. The other end of the shock absorber is provided with a connecting rod 41 integrally joined to the lower end of the cylindrical body 39 and having a transverse attachment hole 42 at its extreme outer end.

The shock absorber mounting at the upper end of the assembly 18 is accomplished by providing a cup like cylindrical fitting 43 having an externally threaded radial flange 44 threadably secured to nut 24. Flange 44 is supported by the upper end of the tube 19. The closed body portion 46 extends axially inwardly of the tube 19 in contact therewith. A small aperture 47 is provided in the bottom of the fitting 43 through which extends the threaded end 48 of the plunger rod 37 as it bottoms against the fitting. Nut 49 threadably secures the plunger rod end 48 to the fitting. A cap 51 effectively covers the fitting 43 against the entrance of dirt and water.

At its lower end, the shock absorber connector rod 41 is secured by a threaded anchor bolt 54 which extends through the aperture 52 in the hub 33, sleeve 34 and tube 17 and is secured in threaded aperture 53. The space 56 between the shock absorber body 39 and the strut 19 is sufficient to prevent any binding of the shock absorber in the normal operation of the vehicle.

It will be understood that the invention is not to be limited to the exact construction shown and described, but that various changes and modifications may be made without departing from the spirit and scope of the invention, as defined in the appended claims.

What is claimed is:

1. An independent suspension for a motor vehicle having a frame and a road wheel, comprising a wheel spindle rotatably mounting said road wheel, a suspension arm pivotally connected at one end to said frame and universally connected at its opposite end to said wheel spindle, a coiled spring supported on a medial portion of said arm and acting between said arm and said frame, inner and outer concentric struts, said outer strut being secured at its lower end to said wheel spindle, said inner strut being resiliently supported at its upper end upon said frame, said inner and outer struts defining an annular space therebetween, an integral fluid shock absorber having a cylinder body portion, a movable plunger at one end of said body and a fixed connecting rod at the other end of said body, said plunger and connecting rod being secured to the outer end of said inner strut and to the lower end of said outer strut respectively, said cylinder body portion being smaller in diameter than said inner and outer telescopic members and defining a predetermined space between said shock absorber body and said struts.

2. An independent suspension for a motor vehicle having a frame and a steerable road wheel, comprising a wheel spindle rotatably mounting said road wheel, a lower wishbone pivotally connected at one end to said frame and universally connected at its opposite end to said wheel spindle, a compression spring supported on a medial portion of said lower wishbone and acting between said wishbone and said frame, a combined shock absorber and telescopic control unit secured at its lower end to said wheel spindle and extending generally vertically upwardly therefrom, means resiliently connecting the upper end of said unit to said frame, said unit including a shock absorber disposed within said unit and connected at its ends to said unit in a spaced apart relationship to said unit whereby the bending of said unit will not result in the impinging of the shock absorber.

3. The structure defined by claim 2 which is further characterized in that said shock absorber is provided with a movable plunger rod at one end threadably secured to the upper part of said unit and a connecting rod at the opposite end, said connecting rod having a transverse opening in the outer end thereof, and an anchor bolt passing through said transverse opening and engaging said wheel spindle.

4. An independent suspension for a motor vehicle having a frame and a road wheel, comprising a wheel spindle rotatably mounting said road wheel, a suspension arm pivotally connected at one end to said frame and universally connected at its opposite end to said wheel spindle, a coiled spring interposed between the frame and the suspension arm medially of its ends, inner and outer concentric struts, said outer strut being secured at its lower end to said wheel spindle, a support assembly secured to said frame, means resiliently mounting said inner strut at its upper end to said support assembly, said inner and outer struts defining a variable length annular space, a fluid shock absorber having a cylindrical body portion, a movable plunger at one end of said body and a fixed connecting rod at the other end of said body, said shock absorber being disposed concentrically within said annular space with its body portion in spaced apart relationship to said inner and outer struts, said movable plunger being detachably connected to the upper end of said inner strut, a bolt pivotally securing the fixed connecting rod to the lower end of the outer strut, said shock absorber body portion being free from contact at all times with the inner and outer struts.

5. An independent suspension for a motor vehicle having a frame and a steerable road wheel, comprising a wheel spindle rotatably mounting said road wheel, a lower wishbone pivotally connected at one end to said frame and universally connected at its opposite end to said wheel spindle, a compression spring supported on a medial portion of said lower wishbone and acting between said wishbone and said frame, a combined shock absorber and telescopic control unit secured at its lower end to said wheel spindle and extending generally vertically upwardly therefrom, means connecting the upper end of said combined shock absorber and telescopic control unit to said frame, said unit including a shock absorber disposed within said unit and connected at its ends to said unit, said means including an inverted cup secured to said unit and flexible means interposed between said inverted cup and said frame, said shock absorber being disposed within said unit in a spaced apart relationship to said unit whereby the bending of said unit will not result in the impinging of the shock absorber by said unit.

6. The structure defined by claim 4 which is further characterized in that said means resiliently mounting said inner strut at its upper end to said support assembly comprises an inverted dished member secured to the upper end of said inner strut, a U shaped member secured to said support assembly, and a pair of resilient pivot bushings mounted upon said dished member and journalled in said U shaped member.

References Cited in the file of this patent
UNITED STATES PATENTS

| | | |
|---|---|---|
| 2,105,246 | Horsfield | Jan. 11, 1938 |
| 2,124,087 | Smith | July 19, 1938 |
| 2,259,589 | Schleicher | Oct. 21, 1941 |
| 2,260,634 | Mullner | Oct. 28, 1941 |
| 2,355,274 | Castiglia | Aug. 8, 1944 |
| 2,660,449 | MacPherson | Nov. 24, 1953 |
| 2,823,927 | Goby | Feb. 18, 1958 |